(12) United States Patent
Mamié et al.

(10) Patent No.: US 6,711,786 B2
(45) Date of Patent: Mar. 30, 2004

(54) RATCHETED LASHING STRAP ASSEMBLY

(75) Inventors: André Mamié, Horgen (CH); David Ehnimb, Oberrieden (CH)

(73) Assignee: Spanset Inter AG, Oetwil am See (CH)

( * ) Notice: Subject to any disclaimer, the term of this patent is extended or adjusted under 35 U.S.C. 154(b) by 27 days.

(21) Appl. No.: 10/170,291

(22) Filed: Jun. 13, 2002

(65) Prior Publication Data

US 2003/0000047 A1 Jan. 2, 2003

(30) Foreign Application Priority Data

Jun. 13, 2001 (DE) ......................... 101 28 600

(51) Int. Cl.[7] ..................... A44B 21/00; B25B 25/00; B60P 7/08; B66D 1/02
(52) U.S. Cl. ................. 24/68 CD; 24/69 CT; 24/196; 24/265 AL; 24/909; 410/105; 410/110
(58) Field of Search .................. 24/68 CD, 69 CT, 24/196, 265 AL, 616, 909; 182/116; 410/105, 110; 254/218

(56) References Cited

U.S. PATENT DOCUMENTS

| 2,997,761 A | | 8/1961 | Davis | |
|---|---|---|---|---|
| 3,893,304 A | * | 7/1975 | Pochitaloff-Huvale et al. | 61/46 |
| 4,199,182 A | * | 4/1980 | Sunesson | 24/68 CD |
| 4,227,286 A | * | 10/1980 | Holmberg | 24/68 CD |
| 4,493,135 A | * | 1/1985 | Crook, Jr. | 24/196 |
| 4,823,443 A | * | 4/1989 | Waters | 24/68 CD |
| 5,058,243 A | * | 10/1991 | Rasmussen | 24/68 CD |
| 5,778,496 A | * | 7/1998 | Huang | 24/68 CD |
| 5,933,923 A | | 8/1999 | Catlos et al. | |

FOREIGN PATENT DOCUMENTS

| DE | 28 45 227 C2 | 5/1979 |
|---|---|---|
| DE | 88 09 854.0 | 12/1988 |
| EP | 0 634 305 A1 | 1/1995 |

* cited by examiner

*Primary Examiner*—Victor Sakran
(74) *Attorney, Agent, or Firm*—Laurence A. Greenberg; Werner H. Stemer; Gregory L. Maybach

(57) ABSTRACT

A ratcheted lashing strap assembly is described. The assembly is formed of a lashing strap and a tightening device. The tightening device has a frame and a winding drum, rotatable in the frame, for winding up the lashing strap. A fixation end of the lashing strap, in the form of a loop, grips a retention strut that is parallel to the winding drum and is firmly attached to the frame. An eye of the loop is penetrated by a support strut, extending approximately parallel to the retention strut, that as a separate component from the tightening device protrudes by both ends from the loop eyelet and on the side opposite the winding drum from the cinching side is braced on the frame on the retention strut and assumes a variable distance from the retention strut. An end run, adjoining a loop foot, of the lashing strap is fixed in clamping fashion by the support strut between the loop and the lashing strap to be cinched.

22 Claims, 3 Drawing Sheets

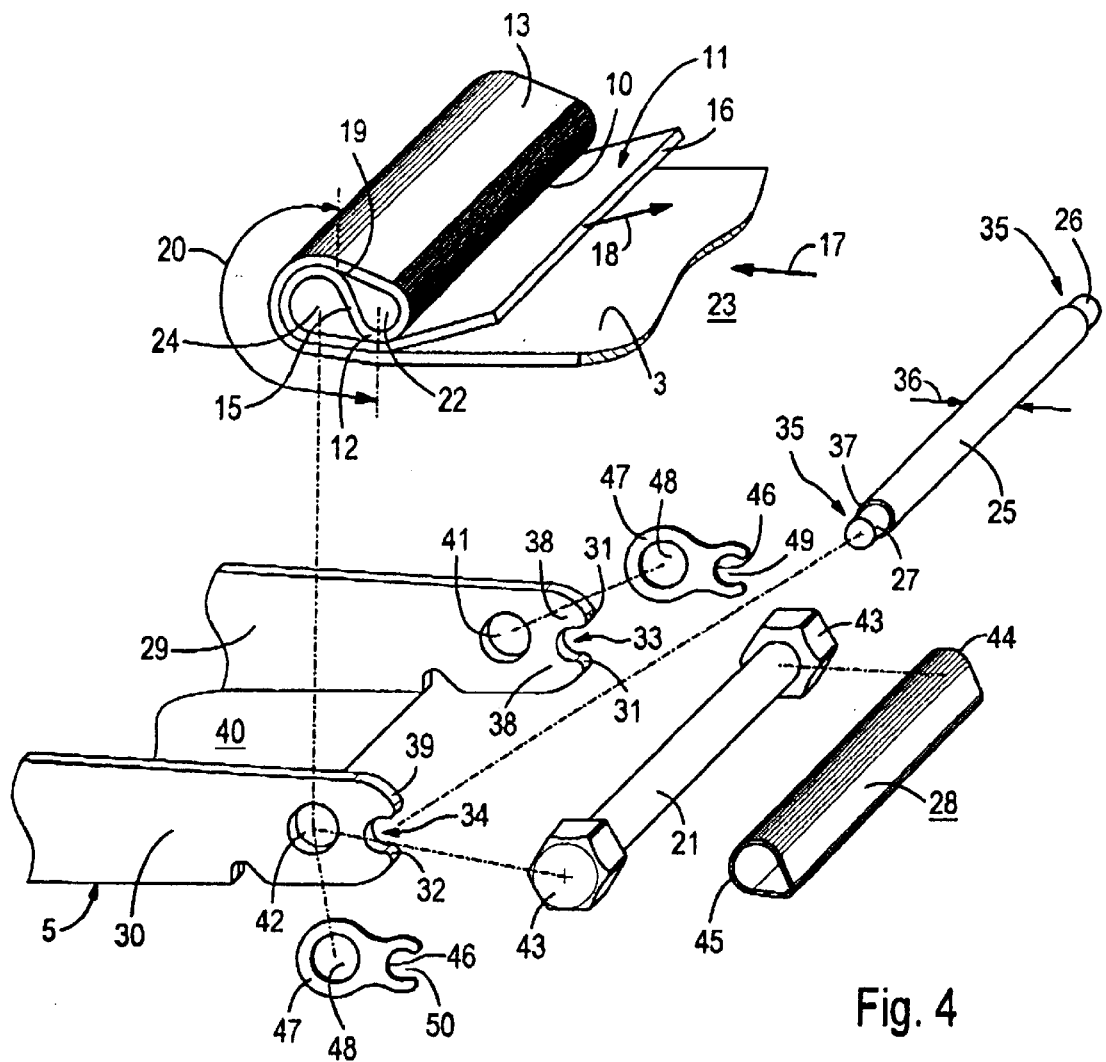
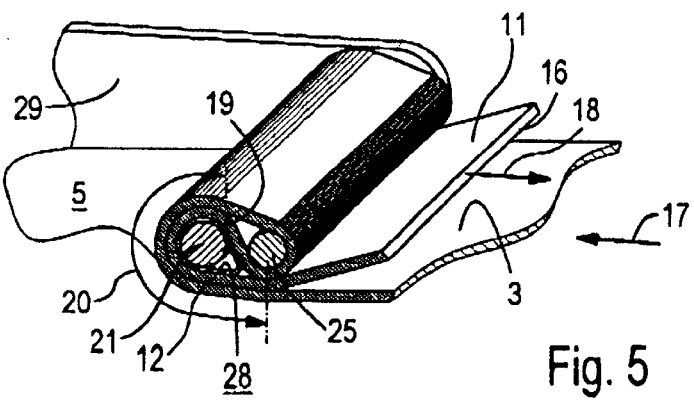

RATCHETED LASHING STRAP ASSEMBLY

BACKGROUND OF THE INVENTION

Field of the Invention

The invention relates to a ratcheted lashing strap assembly containing a lashing strap that can be wrapped around the goods to be cinched, and a tightening device for the lashing strap. The tightening device includes a frame and a rotatable winding drum, in particular driven manually, in the frame for winding up the lashing strap. A fixation end of the lashing strap is in the form of a loop that grips a retention strut firmly attached to the frame and oriented parallel to the axis of the winding drum. An eye of the loop is penetrated by a support strut extending approximately parallel to the retention strut. An end run of the lashing strap, adjoining a loop base, is fixed, by clamping by the support strut, between the loop and the lashing strap. One such lashing strap is known from German Patent DE 28 45 227 C (see FIG. 3 in particular).

In the known ratcheted lashing strap assembly, the tightening device is a manually actuatable "tension ratchet". This is preferably the case in the subject of the invention as well. In this reference, the fixation of the fixed end of the lashing strap, that is, the end opposite the cinching end wound onto the winding drum, is accomplished by two parallel bolts positioned side by side that are stationary in the housing. The two bolts are the retention strut and the support strut disposed parallel to the retention strut. Both struts are solidly connected to other parts of the frame. As fixed components of the frame, they form a unit with it.

The fixation of the fixed end of the lashing strap in the previously known tension ratchet is a clamping fixation. It thus avoids the usual seam connections between the upper run and lower run of the strap region that forms the curve of the loop, and in the relieved state it enables a variable preadjustment of the length of the lashing strap.

For its fixation on the frame, the fixation end of the lashing strap is wrapped around both the retention strut and the support strut extending parallel to it. Because of the invariable stationary fixation of the two struts in the frame, the operation involves threading something in, which requires special manual skill and attention on the part of the worker. Only when there is an exact relative position of the upper run and lower run of the end of the band relative to the retention strut and to the support strut is a secure clamping fixation assured. The security of the clamping fixation is indispensable, for reasons of job safety (protection of personnel).

From U.S. Pat. No. 5,933,923, a strap tightener for securing a strap around a load is known. The strap tightener has four pins mounted parallel to one another on a frame. Each two pins form a pair of pins, with one fixed pin and one movable pin. For securing the strap webbing, the strap is wrapped in a loop around the pins of one pair of pins at a time. The strap webbing is fixed to the strap tightener solely by the loop and the friction generated by the loop. Moreover, prestressing the strap tightener requires an additional device.

Published, Non-Prosecuted German Patent Application DE 88 09 854 A shows a strap connector on the end of a tension strap for securing loads. Once again, the strap webbing is disposed in a loop around two parallel bolts in a housing. For threading in the end of the strap, individual bolts can be removed from the housing, which makes handling the strap connector much simpler. If strap webbings of comparatively very slight thickness are used, three axially parallel bolts are provided as retention ribs. Here again, the fixation of the strap webbing is done solely by the friction generated by the loop.

SUMMARY OF THE INVENTION

It is accordingly an object of the invention to provide a ratcheted lashing strap assembly that overcomes the above-mentioned disadvantages of the prior art devices of this general type, in which a secure clamping fixation of the fixed end of the lashing strap to the frame is facilitated in terms of manipulation.

With the foregoing and other objects in view there is provided, in accordance with the invention, a ratcheted lashing strap assembly. The lashing strap assembly contains a lashing strap for wrapping around goods to be cinched and a tightening device engaging the lashing strap. The tightening device has a frame, a rotatable winding drum for winding up the lashing strap and supported in the frame, and a retention strut firmly attached to the frame and oriented parallel to an axis of the rotatable winding drum. A support strut extends substantially parallel to the retention strut. The lashing strap has a fixation end in a form of a loop gripping the retention strut and disposed remote from the rotatable winding drum. The loop has a loop base and an eye penetrated by the support strut. The support strut protrudes as a separate component from the tightening device. The support strut has ends protruding from the eye of the loop and are braced on the frame. The support strut is disposed on a side of the retention strut opposite the rotatable winding drum, and the support strut assumes a variable distance from the retention strut. The lashing strap has an end run adjoining the loop base. The end run is fixed between the loop and the lashing strap by clamping by the support strut.

The support strut is embodied as a separate component from the tightening device and protrudes by both ends from the eye of the loop, and with the two ends it is merely braced on the frame, on the side of the retention strut opposite the winding drum, and therefore rests, in the relieved state of the lashing strap, in a way that can be easily released at any time. The support strut assumes a variable spacing from the retention strut.

As a result, the retention strut but not the support strut is solidly connected to the frame of the tightening device. Wrapping the fixation end of the lashing strap around the retention strut can be achieved without problems, since access to the retention strut is not—as in the known tightening device—hindered by the support strut fixed in stationary fashion beforehand. The use of the ratcheted lashing strap of the invention enables simple, secure fixation of the fixed end of the lashing strap.

Especially the fixation end of the ratcheted lashing strap, that is, the eye of the loop put in place, that is wrapped to make a loop and therefore is intrinsically harder to manipulate, can be wrapped more easily around the retention strut, which according to the invention is accessible from outside freely and without hindrance. The support strut that forms a separate single part is easily inserted first into the eye of the loop, that is, thrust through from the side, once the eye of the loop has already been wrapped around the retention strut. The shape of the loop itself can be adapted to the support strut during the fastening process. Only after that is the lashing strap fixed to the frame with the aid of the support strut. Maintaining the spacing of the support strut, with its two ends protruding from the eye of the loop, relative to the retention strut is done either directly by the frame or indirectly by separate spacer elements, fundamentally automatically, and in a manner that is stationary, particularly under the tensile load on the lashing strap.

A contact position of the ends of the support strut on the frame, or more generally their bracing relative to the retention strut, can likewise be secured or perpetuated in an easily releasable fashion by a snap connection between the bracing or contact parts. The snap connection can be achieved by simple shaping provisions on the frame of the tightening device. Such a snap connection is a familiar machine element that can be made in various embodiments (see the reference by Bauer, titled "Handbuch der verbindungstechnik" [Manual of Connection Technology], Carl Hanser Verlag München Wien, 1991, ISBN 3-446-14609-1, pages 294–324).

The ratcheted lashing strap of the present invention can be produced simply and economically. It meets the most stringent possible demands. Breaking strengths of up to 5000 daN are achieved with a standard ratchet.

The later insertion of the support strut into the eye of the loop wrapped around the retention strut is facilitated, in that the support strut rests circumferentially with a loose clearance fit in the eye of the loop. Under cinching tension, the support strut then assumes a position that is determined by the strap thickness of the lashing strap selected for the particular ratcheted lashing strap assembly, and thus with the ratcheted lashing strap assembly of the invention, lashing straps of the most various thicknesses can be used.

Once the lashing strap is securely fixed, the position of the loop is also fixed. The ensuing tightening of the lashing strap is thus accomplished especially securely.

The safety of the clamping connection between the fixed end of the lashing strap and the frame of the tightening device, and in particular the tension ratchet, is increased if the retention strut is surrounded by an approximately hollow-cylindrical sleeve with a loose clearance fit. The encasing sleeve compensates for different strap thicknesses and under cinching tension rests firmly against the clamped lashing strap. It is especially advantageous if the cross-sectional shape of the sleeve is variable under the influence of the circumferential pressure exerted under cinching tension by the doubled region of the strap, or in other words adapts to the loop. Under cinching tension, the sleeve assumes a cross-sectional shape (i.e. teardrop shaped) that effectively prevents rotation of the encasing sleeve. Protective-clamping is effected over a larger surface area region than in the case of two strap bolts that are not deformable under load. At the same time, the increase in clamping surface area is further promoted by the loose clearance fit of the sleeve on the retention strut. The encasing sleeve is preferably formed from steel and coated with zinc and/or chromium.

Embodying the two ends of the support strut as bearing pegs, with a cross-sectional dimension or peg diameter that is reduced compared to the support strut cross section or the support strut diameter has the advantage that the two vertical legs of the U-shaped sheet-metal part are kept spaced apart from one another by the steps between the support strut and the terminal bearing pegs, and this is true even under high cinching tension. The legs of the u-shaped frame support both the winding drum and the retention strut. As a result, a frame of stable shape can be produced economically by deformed sheet metal, even if the tightening device is to be used for high cinching forces. The separate, intrinsically loose support strut therefore not only has an important function in assuring the clamping of the cinching end of the lashing strap but also for stabilizing the shape of the frame of the tightening device.

The snap fixation, already described earlier herein, between the support strut and the frame can be produced simply, especially if sheet metal is used as a frame former, by stamping technology, through recesses in the end edges of the legs of the U-shaped frame. The recesses serve to put the ends of the support strut in place and thus provide a secured locational positioning of the support strut in its desired position. This results in a form-locking connection between the legs and the support strut.

The support strut, for reasons of manipulation, should also be retained as much as possible in a fixed position parallel to the retention strut. This can be assured on the one hand by a suitable embodiment of the frame but on the other by separate retaining elements. The retaining elements are embodied, structurally expediently, as retaining disks, which are threaded onto the retention strut and are thereby positioned in a simple way in their desired position relative to the retention strut. The positional fixation of the support strut after it has been threaded into the retaining loop can also be done at the retaining elements or retaining disks by a snap connection that is then provided there.

Advantageously, the support strut can also be coated on its circumference with a plastic. The coating can promote the safety of the positional fixation of the support strut to the frame or to the retention strut. The plastic coating can, however, also serve to cover production variations of the support strut, which can be a stamped, turned or forged part. Moreover, such a coating favorably affects the friction in the system. Instead of a snap connection, a clamping connection is also conceivable.

The support strut can be connected to the frame in a form-locking or force-locking manner. A form-locking connection is one that connects two elements together due to the shape of the elements themselves, as opposed to a force-locking connection, which locks the elements together by force external to the elements. A force-locking connection is one that connects two elements together by force external to the elements, as opposed to a form-locking connection, which is provided by the shapes of the elements themselves.

Other features which are considered as characteristic for the invention are set forth in the appended claims.

Although the invention is illustrated and described herein as embodied in a ratcheted lashing strap assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is an exploded perspective view of parts essential to the fixation of the fixation end of the lashing strap to the tightening device; and FIG. 5 is a perspective, sectional view taken along the line V—V shown in FIGS. 2 and 3.

DESCRIPTION OF THE PREFERRED EMBODIMENTS

Figure 1:
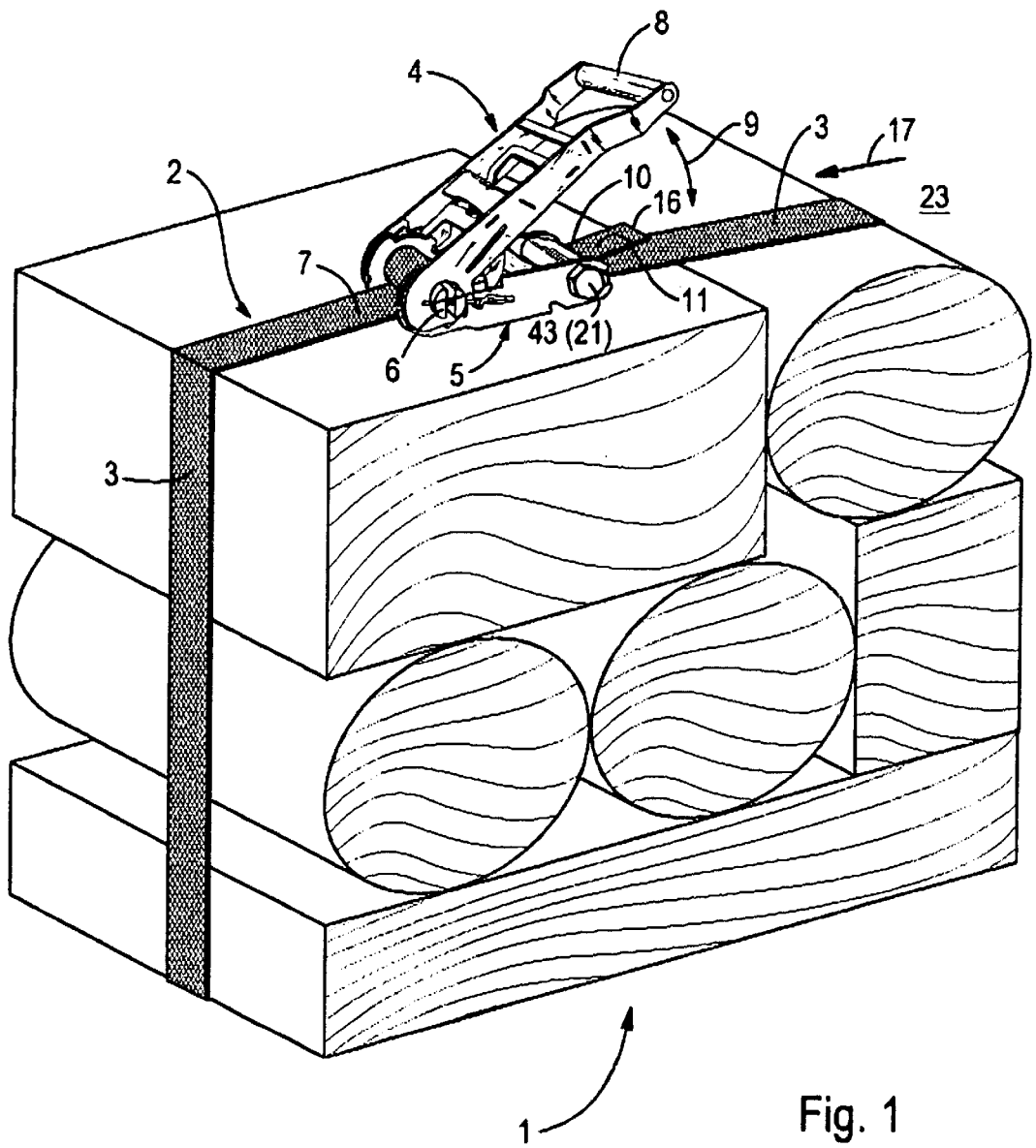
FIG. 1 is a perspective view of a load, held together by a ratcheted lashing strap assembly tightened by a tightening device according to the invention.
Figure 2:
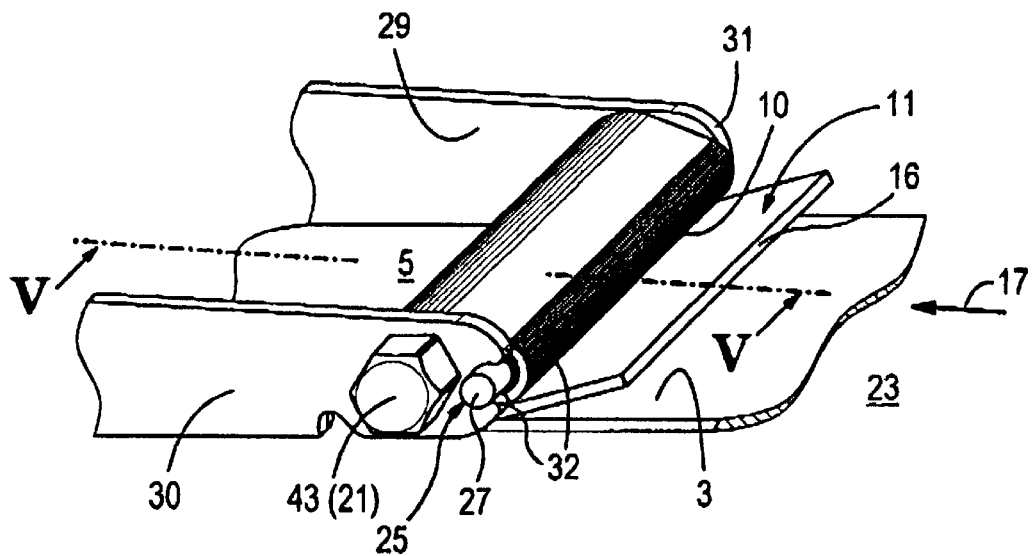
FIG. 2 is an enlarged perspective view of a structural embodiment of the fixing of a fixation end of a lashing strap to the tightening device.

Referring now to the figures of the drawing in detail and first, particularly, to FIG. 1 thereof, there is shown a ratcheted lashing strap assembly 2, wrapping around or bundling a stacked load 1. The lashing strap assembly 2 contains a lashing strap 3 and a tightening device 4 that tightens the lashing strap 3. The tightening device 4 contains a frame chassis 5, hereinafter called simply a "frame" 5 for short. The frame 5 supports a winding drum 6, of which in FIG. 1 only the end of a bearing peg protruding past the edge of the frame 5 can be seen. This end symbolizes the winding drum 6 for winding up a winding end 7 of the lashing strap 3 in the tightening device 4.

A torque for the winding rotation of the winding drum 6 is generated manually by a hand lever 8 of a ratchet gear, not described in further detail here. The gear and its function are described in the prior art cited at the outset. For transmitting torque to the winding drum 6, the hand lever 8 is pivoted back and forth in the form of pump-like motions in the directions of arrow 9. The cinching rotation of the winding drum 6 is initiated by pivoting the hand lever 8 upward in the counterclockwise direction of the directions indicated by the arrow 9.

A fixation end 10 of the lashing strap 3 is fixed on an end of the frame 5 of the tightening device 4 remote from the winding drum 6. The structural embodiment of the fixation is the nucleus of the invention described in detail hereinafter in conjunction with FIGS. 2–5.

An end run 11 of the lashing strap 3, which run is associated with the fixation end 10, is wrapped in a looping arc extending around 360° to form a loop 12 (FIG. 4). An upper flank of the loop 12 is formed by an upper run 13 extending in a longitudinal direction 14 of the strap 3, while the flank at a bottom of the loop 12 is formed by a lower run 15. Thus in the longitudinal direction 14 of the strap, the loop 12 operationally forms the fixation end 10 of the lashing strap 3, although an absolute end 16 of the lashing strap 3 extends as a continuation of the lower run 15 in a opposite direction 18 to the cinching direction 17, past the loop 12. By laying the lashing strap 3 into the loop 12, a doubled region 20 of the strap 3 is created in the longitudinal course of the lashing strap 3, adjacent to a loop base 19, with its portion oriented toward the absolute end 16, grips a retention strut 21 in the counterclockwise direction. The retention strut 21 is firmly attached to the frame 5 and extends crosswise to the length of the lashing strap 3. The retention strut 21 is connected in stationary fashion to the frame 5, or in other words is an integral component of the frame 5. The two parts of the lashing strap 3 that form the doubled region 20 of the strap and adjoin the loop 12 and an eye 22 of the loop toward the absolute end 16 thus act upon the circumference of the retention strut 21, on its circumferential face remote from a cinching side 23. In the installed position, the retention strut 21 rests inside an eye 24 of the double strap, formed by the doubled region 20 of the strap 3 and the loop 12.

A support strut 25 is extended through a second eye 22 of the loop 12. Like the retention strut 21, the support strut 25 is a component oriented rectilinear to the longitudinal direction. Both the retention strut 21 and the support strut 25 are of solid-cylindrical cross-sectional shape, on the order of a shaft. While the retention strut 21 in the installed state is an integral component of the frame 5, described in further detail hereinafter, of the tightening device 4, the support strut 25 forms a separate component separated from the tightening device 4. In its functional position, the support strut 25 rests inside the eye 22 of the loop 12. With its ends 26, 27, the support strut 25 protrudes from the eye 22 of the loop on both sides. In the installed state, the support strut 25 rests with the ends 26, 27 braced on the frame 5 from the cinching side 23 and rests circumferentially with a loose clearance fit in the eye 22 of the loop. Under cinching tension, oriented in the opposite direction from the cinching direction 17, the support strut 25 is pulled against the frame 5 by the eye 22 of the loop, wrapping around it, in the cinching direction 17 and is thereby held at a fixed spacing from and parallel to the retention strut 21.

The retention strut 21, which extends parallel to the support strut 25, is surrounded by an approximately hollow-cylindrical encasing sleeve 28 with a loose clearance fit. While the retention strut 21 has an outer diameter of 13 mm, for instance, an inside diameter of the encasing sleeve 28 is 14 mm, with an outer diameter of 16 mm. The wall thickness of the steel encasing sleeve is accordingly 1 mm. Its hollow-cylindrical cross-sectional shape is variable under cinching tension, namely under the circumferential pressure acting on it from the doubled region 20 of the strap 3, because of the large clearance fit of its support on the retention strut 21. Under the cinching tension, oriented counter to the cinching direction 17 and exerted by the doubled region 20 of the strap 3, the encasing sleeve 28 assumes the approximate cross-sectional shape of a teardrop, as shown in FIG. 5.

The outer circumference of the encasing sleeve 28 is coated, in particular zinc-plated and/or chromium-plated.

The frame 5 that supports the winding drum 6 and the hand lever 8 and fixes the retention strut 21 is a component having U-shaped cross section, in particular a sheet-metal part bent into a U. Legs 29, 30 of the U-shaped frame 5 extend in the cinching direction 17 and between them support the winding drum 6 and the hand lever 8. With their end edges 31, 32 facing counter to the cinching direction 17, the legs 29, 30 intrinsically embody the spacer elements required for the stationary spacing apart of the support strut 25 from the retention strut 21. In any event, this is true for the embodiment of FIG. 2, in which the support strut 25, with its ends 26, 27 that protrude on both sides from the eye 22 of the loop of the lashing strap 3 that is in place, rests on the end edges 31, 32, remote from the winding drum 6, of the legs 29, 30 of the U-shaped frame 5. As a result, the two steps 37 flanking a bearing peg 35 space the ends 31, 32 of the legs 29, 30 of the U-shaped frame 5, which are not stabilized in the region of their ends 31, 32 by a transverse head 40, apart from one another. The transverse head 40, in the central region of the frame 5 oriented toward the winding drum 6, acts as a stabilizing central element, in a sense as its backbone.

The retention strut 21 is likewise effective as a frame element that stabilizes the position of the ends 31, 32 of the legs 29, 30 of the U-shaped frame 5. Specifically, inside the region toward the end edges 31, 32 of the legs 29, 30 of the U-shaped frame 5, the retention strut 21 is screwed together inside through holes 41, 42. Screw heads 43 act upon the respective outer flanks of the legs 29, 30 of the U-shaped frame, in their end region protruding freely outside the transverse head 40 (FIG. 4). The encasing sleeve 28 likewise has a stabilizing effect, in a manner to be described below.

The encasing sleeve 28 surrounding the retention strut 21 is located, in the installed position, with its axial ends 44, 45 (FIG. 4) on the inner flanks of the free ends 31, 32 of the legs 29, 30 of the frame 4 in such a way that the ends 31, 32 are kept spaced apart from one another, in particular under the cinching tension acting on the taut lashing strap 3. Maintaining the spacing is a further function of the encasing sleeve 28 that surrounds the retention strut 21 in the installed position.

To secure or perpetuate the support position of the support strut 25 located at the ends 31, 32 of the legs 29, 30 of the U-shaped frame 5, the end edges 31, 32 of the legs 29, 30 are embodied as snap members of a snap connection. The snap connection is especially promoted by recesses 33, 34 on the ends 31, 32 of the legs 29, 30. Other positions for positionally securing a position are also conceivable.

Figure 3:
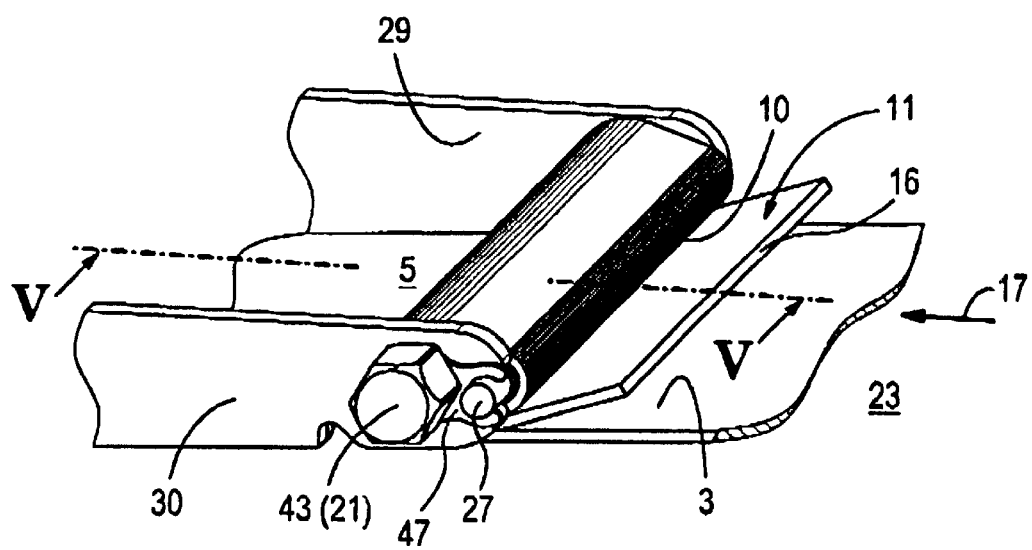
FIG. 3 is a perspective view of a modified embodiment of the fixation of the fixation end of the lashing strap to the frame analogous to FIG. 2.

In the embodiment of FIG. 3, the support strut 25 additionally rests with its two ends 26, 27, formed by the bearing pegs 35, in positioned fashion each in a respective retention disk 47. The retention disks 47 are threaded by their hole passages 48 onto the retention struts 21. In the installed position, they each rest between a respective axial end 44, 45 of the encasing sleeve 28 and the inner flank of one leg 29, 30 of the U-shaped frame 5 that fixes the retention strut 21.

The retention disk 47 is recessed in the form of recesses 49, 50, for the sake of stationary fixation of the support strut in the radial direction. The recesses 49, 50, analogously to the recesses 33, 34 on the ends 31, 32 of the legs 29, 30 of the U, form the functional parts of a snap connection, namely its snap members.

We claim:

1. A ratcheted lashing strap assembly, comprising:
   a lashing strap for wrapping around goods to be cinched;
   a tightening device engaging said lashing strap, said tightening device having a frame, a rotatable winding drum for winding up said lashing strap and supported in said frame, and a retention strut firmly attached to said frame and oriented parallel to an axis of said rotatable winding drum; and
   a support strut extending substantially parallel to said retention strut;
   said lashing strap having a fixation end in a form of a loop gripping said retention strut and disposed remote from said rotatable winding drum, said loop having a loop base and an eye penetrated by said support strut;
   said support strut protrudes as a separate component from said tightening device, said support strut having ends protruding from said eye of said loop and braced on said frame, said support strut disposed on a side of said retention strut opposite said rotatable winding drum, and said support strut assumes a variable distance from said retention strut;
   said lashing strap having an end run adjoining said loop base, said end run fixed between said loop and said lashing strap by clamping by said support strut.

2. The ratcheted lashing strap assembly according to claim 1, wherein said support strut has a circumference and rests on said circumference with a loose clearance fit in said eye of said loop and during a cinching tension assumes a position that is determined by a thickness of said lashing strap and thereby brings about the clamping of said lashing strap.

3. The ratcheted lashing strap assembly according to claim 1, further comprising an encasing sleeve surrounding said retention strut with a loose clearance fit, said encasing sleeve having a substantially hollow-cylindrical shape.

4. The ratcheted lashing strap assembly according to claim 3, wherein:
   said loop forms a double region of said lashing strap; and
   said encasing sleeve has a cross-sectional shape that is variable by said doubled region of said lashing strap under an influence of a circumferential pressure exerted.

5. The ratcheted lashing strap assembly according to claim 4, wherein said cross-sectional shape of said encasing sleeve, under a cinching tension, has an outline of a teardrop.

6. The ratcheted lashing strap assembly according to claim 3, wherein said encasing sleeve is a steel sleeve.

7. The ratcheted lashing strap assembly according to claim 6, wherein said encasing sleeve has an outer circumference coated with at least one material selected from the group consisting of zinc and chromium.

8. The ratcheted lashing strap assembly according to claim 3, wherein said frame has a U-shape with vertical legs supporting said rotatable winding drum and fixing said retention strut, said vertical legs having end edges and said ends of said support strut, protruding from both sides of said eye of said loop, rest on said end edges, remote from said rotatable winding drum.

9. The ratcheted lashing strap assembly according to claim 8, wherein said end edges each have a recess formed therein for receiving and fixing said ends of said support strut.

10. The ratcheted lashing strap assembly according to claim 9, wherein said support strut has a middle section with a first cross-sectional dimension and said ends extend from said middle section, said ends of said support strut are formed by bearing pegs having a second cross-sectional dimension being smaller than said first cross-sectional dimension of said middle section.

11. The ratcheted lashing strap assembly according to claim 10, wherein at least one of said ends of said support strut and one of said end edges of said vertical legs form a form-locking connection.

12. The ratcheted lashing strap assembly according to claim 8, wherein said encasing sleeve surrounding said retention strut has axial ends resting on said vertical legs of said frame, said axial ends fixing said retention strut in such a way that said axial ends keep said vertical legs of said frame spaced apart from one another under a cinching tension.

13. The ratcheted lashing strap assembly according to claim 12, further comprising a retaining element supported by said retention strut, said retaining element supporting at least one of said ends of said support strut.

14. The ratcheted lashing strap assembly according to claim 13, wherein said retaining element rests between one of said axial ends of said encasing sleeve and one of said vertical legs of said frame that fixes said retention strut.

15. The ratcheted lashing strap assembly according to claim 13, wherein said retaining element has a recess formed therein in a direction radial to said retention strut for fixing one of said ends of said support strut.

16. The ratcheted lashing strap assembly according to 15, wherein said recess is part of a snap connection.

17. The ratcheted lashing strap assembly according to claim 1, wherein said support strut has a circumference coated with plastic.

18. The ratcheted lashing strap assembly according to claim 13, wherein said retaining element is a retention disk having a circumference and said support strut is fixed to said circumference of said retention disk.

19. The ratcheted lashing strap assembly according to claim 10, wherein at least one of said ends of said support strut and one of said end edges of said legs form a force-locking connection.

20. The ratcheted lashing strap assembly according to claim 11, wherein said form-locking connection is a snap connection.

21. The ratcheted lashing strap assembly according to claim 1, wherein said rotatable winding drum is driven manually.

22. The ratcheted lashing strap assembly according to claim 3, wherein said frame is a sheet-metal part bent into said U-shape.

* * * * *